Figures 1, 2:
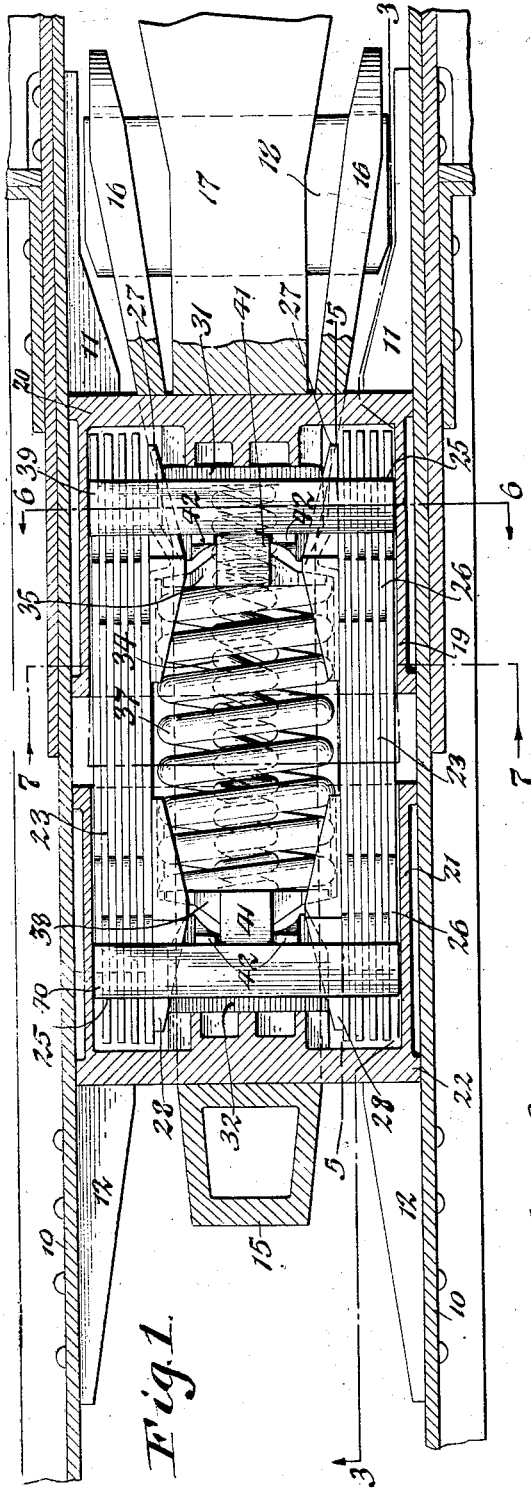

Sept. 30, 1930. J. M. HALL 1,776,973
SHOCK ABSORBER
Original Filed April 17, 1922  3 Sheets-Sheet 1

Inventor
Joseph M. Hall
by Ewer Popp
Attorneys

Sept. 30, 1930. J. M. HALL 1,776,973
SHOCK ABSORBER
Original Filed April 17, 1922 3 Sheets-Sheet 2
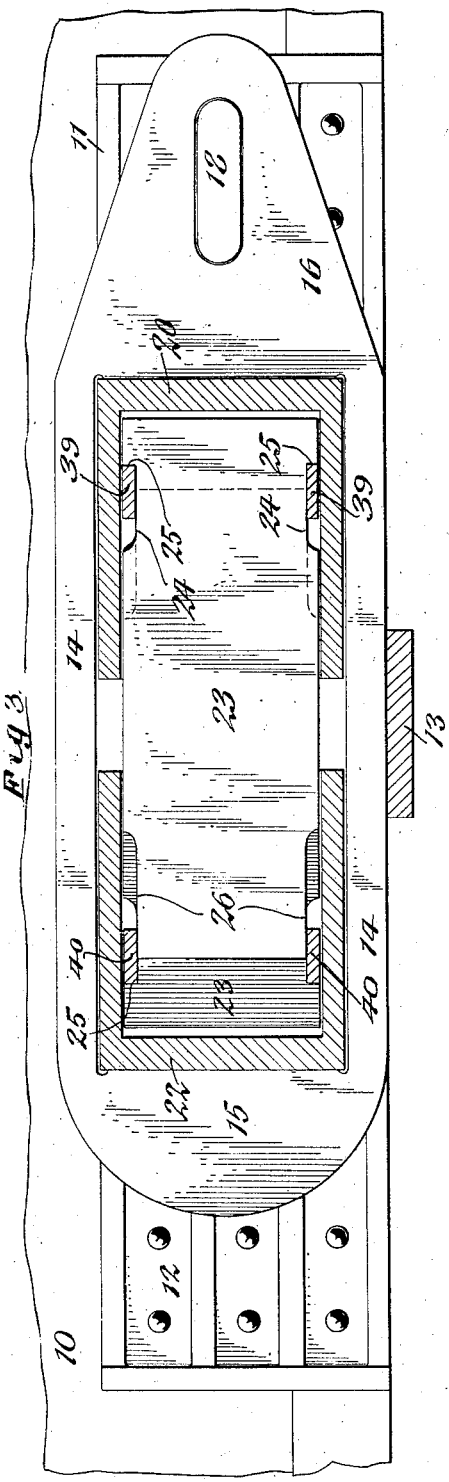
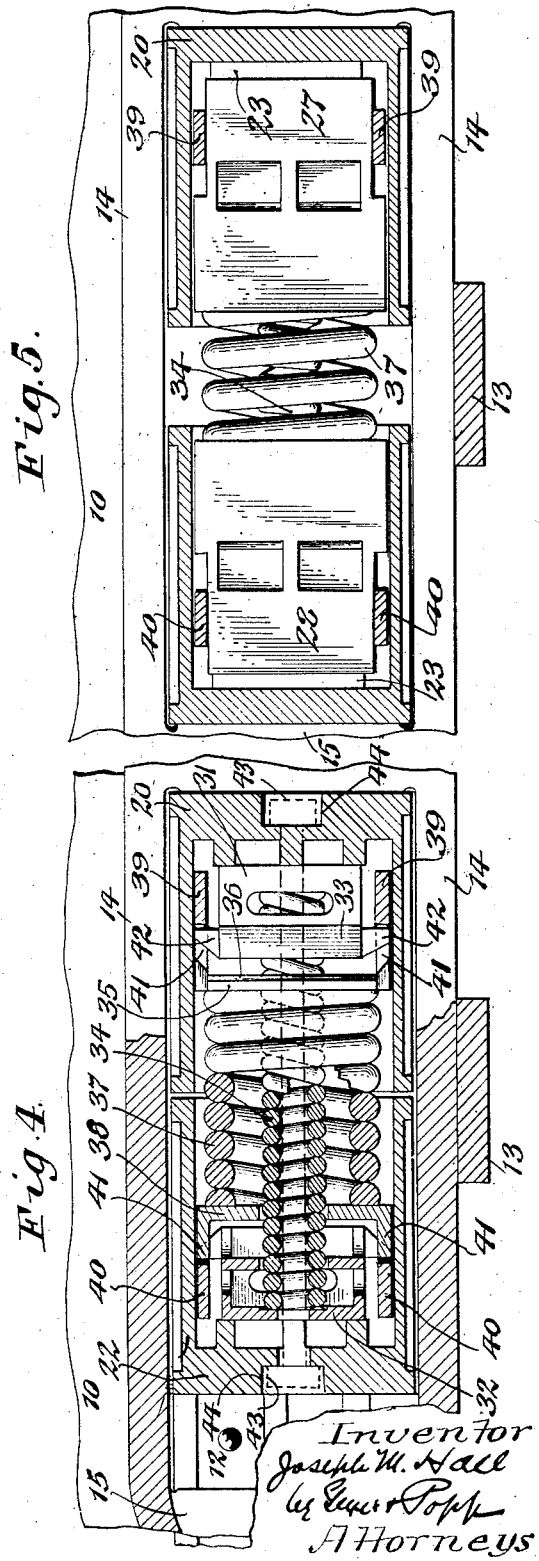

Sept. 30, 1930.  J. M. HALL  1,776,973
SHOCK ABSORBER
Original Filed April 17, 1922    3 Sheets-Sheet 3
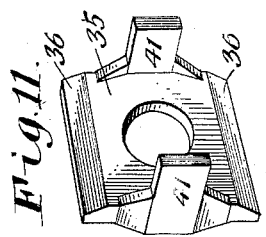
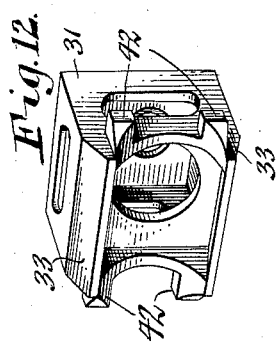
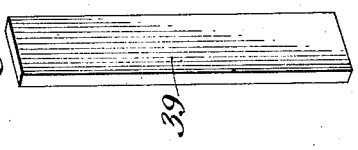
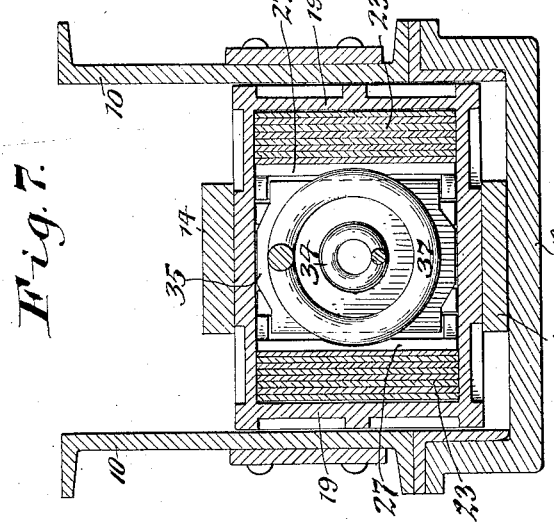
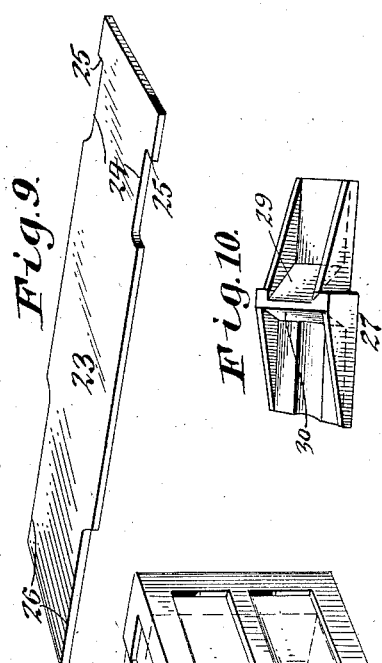
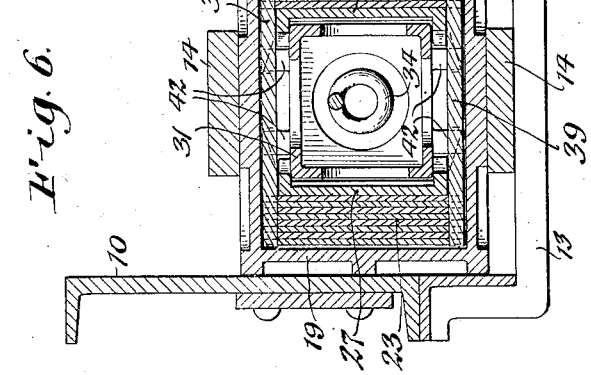
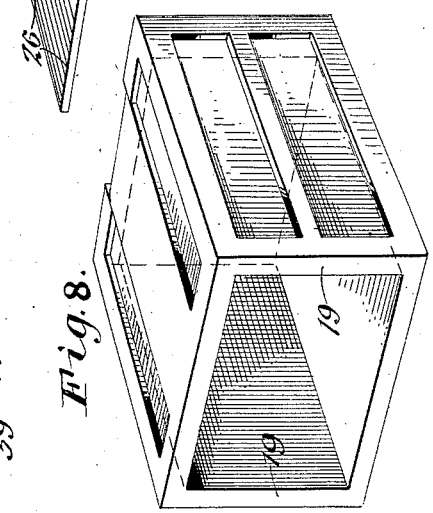
Inventor
Joseph M. Hall
by Geuer & Popp
Attorneys Patented Sept. 30, 1930

1,776,973

UNITED STATES PATENT OFFICE

JOSEPH M. HALL, OF HAMILTON, ONTARIO, CANADA, ASSIGNOR TO HALL DRAFT GEAR CORPORATION, OF BUFFALO, NEW YORK, A CORPORATION OF NEW YORK

SHOCK ABSORBER

Application filed April 17, 1922, Serial No. 554,228. Renewed October 24, 1924.

This invention relates to a shock absorber which is more particularly designed for use on railway cars and the like, although the same may also be used for other purposes in which a cushioning effect is required between two relatively movable parts, and more particularly to a shock absorber in which a plurality of sets of alternating or intercalated plates are employed which slide frictionally lengthwise relatively to each other and which are subjected to increasing lateral pressure during the buffing and pulling actions of the draft gear of the railway car and reduced lateral pressure during the relaxation of the draft gear.

It is the object of this invention to provide simple, compact and effective means for causing the friction plates to be pressed together laterally promptly and offer a greater frictional resisting effect to the load, and also to secure a more prompt and free release of the frictional contact between the several plates during relaxation of the draft gear and thereby obtain a better compression or closing up of the shock absorber and a more free and prompt release of the same.

In the accompanying drawings:

Figure 1 is a horizontal longitudinal section showing this improved shock absorber organized for use as a friction shock absorbing draft gear for railway cars, the parts being represented in the position which they occupy when the gear is released. Figure 2 is a similar view showing the draft gear under a load and compressed to its maximum extent. Figures 3, 4 and 5 are fragmentary longitudinal sections, taken on the correspondingly numbered lines in Figs. 1 and 2, respectively. Figures 6 and 7 are vertical cross sections, taken on correspondingly numbered lines in Fig. 1. Figure 8 is a perspective view of one of the housings, cages or caps forming part of the shock absorbing gear. Figure 9 is a similar view of one of the friction plates thereof. Figure 10 is a similar view of one of the wedge plates of the same. Figure 11 is a similar view of one of the spring seats of this gear. Figure 12 is a perspective view of one of the wedges or wedge blocks forming part of this gear. Figure 13 is a similar view of one of the releasing bars of the same.

Similar characters of reference refer to like parts throughout the several views.

10, 10 represent the longitudinal central sills of a car frame, 11 the front draft lugs or stops arranged on the front parts of the opposing sides of these sills, 12 the rear draft lugs or stops and 13 the transverse carrying bar or iron connecting the lower sides of these sills at a point between the front and rear draft lugs thereof and adapted to support the shock absorbing gear on its underside.

The shock absorbing draft ear containing my invention is arranged between the front and rear draft lugs and the adjacent parts of the central sills of the car frame and is embraced by a yoke having upper and lower longitudinal bars 14 which are spaced apart, a rear cross head 15 connecting the rear ends of the side bars 14 and two coupling arms 16 projecting forwardly from the front ends of these side bars. The rear end of the shank 17 of the car coupler is arranged between the arms 16 of the yoke and connected therewith by means of a key 18, or any other suitable means.

The shock absorbing gear which embodies my improvements and co-operates with the above-mentioned parts of the draft gear of the car, in its preferred form is constructed as follows:

Arranged within the front and rear parts of the slot formed within the yoke are front and rear housings, cages or caps which have their open or concave sides facing each other, each of these housings being preferably rectangular in cross section, and the front housing being provided on its horizontally opposite sides with two flat longitudinal parallel friction walls 19, 19 and a front transverse follower 20 connecting the front ends of these walls, and the rear housing being provided on horizontally opposite sides with two longitudinal parallel flat friction walls 21 and a rear transverse follower 22 connecting the rear ends of the side walls 21, the walls and follower of each housing being preferably formed integrally, as shown in Figs. 1 and 2.

Within horizontally opposite sides of the space of these housings are arranged two sets of intercalated friction plates 23 which are adapted to frictionally engage each other with a longitudinally sliding movement relatively to each other and thus serve as a means for absorbing or taking up part of the shock, work or load, during buffing and pulling strains when coupling or pushing the car or when pulling the same. The plates of one set alternate with those of another set on the same side of the gear so that these plates overlap one another and engage their flat surfaces in a direction parallel and lengthwise of the direction of movement of the coupler and associated parts. The front ends of the front sets of both pairs of friction plates are adapted to be engaged by the follower and transverse front wall of the front housing, and the rear ends of the rear sets of both pairs of friction plates are adapted to be engaged by the rear follower or transverse wall of the rear housing. Each of these friction plates is provided in its opposite longitudinal edges near the outer end of the respective plate with notches 24, thereby forming inwardly facing shoulders 25 on these plates adjacent to the outer end thereof, while the inner part of each of these plates is correspondingly reduced in width equal to the distance between the notches 24, as shown at 26 in Figs. 3 and 9.

The inner side of the innermost friction plates of both pairs are engaged adjacent to the front follower 20 by means of two front wedge plates or shoes 27 and adjacent to the rear follower 22 by a pair of rear wedge plates or shoes 28. Each of these wedge plates is provided on its inner side with an outwardly facing incline 29 and with an inwardly facing incline 30, the outwardly facing incline being arranged at a comparatively sharp or acute angle and the inner incline 30 being arranged at a comparatively abrupt or obtuse angle, as best shown in Fig. 2.

31, 32 represent front and rear wedges or wedge blocks which are adapted to engage their outer sides with the inner sides of the front and rear followers 20, 22, respectively, and which are provided on their inner ends with the inwardly facing inclines 33 arranged at the same angle as the outer inclines 29 of the wedge plates and adapted to engage the same. 34 is a comparatively light releasing spring preferably of helical form, arranged lengthwise in the center of the gear and engaging its opposite ends with the opposing sides of the front and rear wedges 31, 32.

35, 38 represent front and rear spring seats or washers, the front spring seat being provided on its outer side adjacent to its margin with outwardly facing inclines 36 which engage with and are arranged at the same angle as the inwardly facing inclines 30 of the front wedge plates 27, while the rear spring seat 38 is provided with similar outwardly facing inclines 36 which engage with the inwardly facing inclines 30 of the rear wedge plates, as shown in Figs. 1 and 2.

37 represents a comparatively heavy main or restoring spring, preferably of helical form, surrounding the releasing spring and bearing at its opposite ends against the opposing inner sides of the spring seats 35, 38.

39, 39 and 40, 40 represent front and rear pairs of releasing bars, the members of the front pair being arranged transversely on opposite sides of the front wedge and having their ends projecting in the notches 24 in the longitudinal edges of the front sets of friction plates and the members of the rear pair of releasing bars being arranged on opposite sides of the rear wedge and having their ends projecting into the notches 24 in the longitudinal edges of the rear sets of friction plates.

41, 41 represent two shifting lugs or shoulders arranged on opposite sides of each spring seat and projecting outwardly therefrom and adapted to bear at times against the central parts of the inner edges of the releasing bars at the corresponding end of the absorbing mechanism. On opposite sides of each shifting lug 41 the adjacent wedge is provided with a pair of outwardly projecting shifting lugs or shoulders 42, 42, which are adapted to bear at times against the inner edge of the adjacent releasing bar.

For convenience in holding the elements of the shock absorbing mechanism in their proper relative position during transportation and for convenience in mounting the same in a draft gear of a car or removing the same therefrom, the front and rear housings are temporarily connected by a tie bolt 43 which is adapted to extend through the releasing spring and through corresponding openings in the followers 20, 22, which tie bolt when in use has its head and nut seated in recesses 44 in the outer sides of the followers, as best shown in Fig. 4.

The operation of this shock absorbing mechanism is as follows:

When the shock absorber is fully released, relaxed or open, as shown in Figs. 1 and 5, the front and rear housings bear with their followers against the front and rear stops and against the front arms 16 and rear cross head 15 of the yoke, the front and rear wedges are spread farthest apart by the releasing spring, the spring seats are pushed outwardly to their extreme positions by the main or restoring spring together with the wedge plates which bear with their outwardly facing inclines against the inclines of the wedges, the releasing bars are moved into their outermost positions either by the shifting lugs of the spring seats or the wedges, or by the lugs of both of these members, and the front and rear sets of friction plates of both pairs are pulled apart the maximum extent by engagement of the releasing bars with the shoulders 25 of the friction plates, which latter however at this time, are separated at their outer ends from the followers 20, 21, thereby relieving the lateral outward pressure against the wedge plates and the friction plates against each other.

Upon now moving one of the housings toward the other, as for instance, the front housing toward the rear housing, to the position shown in Figs. 2 and 4, which would be the case during a maximum buffing action, the first effect would be an inward movement of the front housing and front wedge independently of the front sets of friction plates, thereby causing both front and rear wedges, by engagement of their inclines with the outer inclines 29 of the wedge plates to press the same laterally outward, whereby the several sets of intercalated friction plates are caused to engage each other with increased frictional contact. The lateral outward movement of the wedge plates at this time is facilitated by engagement of the inner inclines of the wedge plates with the outwardly facing inclines on the springs seats which reduces the frictional resistance between the wedge plates and the spring seats, thereby insuring a quick and prompt gripping action of the friction plates upon each other.

During this initial inward movement of the front wedge both the front and rear wedge plates are moved lengthwise slightly and a slight increase occurs in the compression of the main or restoring spring. After this initial inward movement of the front wedge and increased grip between the friction plates, the followers of the front and rear housings both engage with the outer ends of the front and rear sets of friction plates and cause the front sets of friction plates to move backwardly relatively to the rear sets of these plates, which movement is not only increasingly resisted by the main or restoring and releasing springs, but also increasingly resisted by the frictional contact between the relatively stationary rear and the longitudinally movable front sets of friction plates by reason of the fact that the increasing resistance of the main or restoring spring causes an increasing lateral wedge action of the wedges against the wedge plates and consequently an increasing frictional grip of the friction plates upon each other and a proportionate increase in the cushioning effect upon the load from which the buffing shock originates. During this frictional sliding engagement of the front sets of the friction plates with the rear sets of friction plates, the latter will be moved slightly backward until their outer ends abut against the rear follower 22, thus carrying the shoulders 25 of the rear friction plates away from the rear releasing bar, as shown at the left of Fig. 2. The shoulders 25 of the front set of friction plates however remain in contact with the outer edge of the front releasing bars 39 and move the latter inwardly to the same extent. During this closing up or compression of the shock absorber the shifting lugs 42 of the wedge will move slightly away from the inner edge of the front releasing bars and the rear releasing bars 40 will be carried rearwardly slightly by reason of the slight rearward movement of the rear wedge plates and spring seat during which time the rear wedge plates push the rear releasing bars rearwardly and away from the shifting lugs 42 of the rear wedge, as shown at the left of Fig. 2.

Upon now removing the load which operated to compress the shock absorber the first effect is that the releasing spring pushes the front wedge forwardly and reduces the wedge action of the same against the front pair of wedge plates, whereby the latter are permitted to move both forwardly and inwardly as the main or restoring spring expands until the lugs 41, 41 come in contact with the release bars 39, 39. This causes the release bars 39 to engage with the friction plates at the shoulders 25. Further expansion of the main or restoring spring necessarily must move the friction plates back to position, as shown in Fig. 1, whereby the frictional contact between the latter is released quickly and fully and the shock absorber is permitted to expand or open promptly and effectively.

It is possible to release the wedges from the wedge plates to accomplish the above-mentioned result due to the release spring being able to move the housing 19 and wedge 31 outwardly independently of other draft gear parts. This outward movement allows the pressure of contact to be removed between the wedges and wedge plates and the draft gear to open or relax.

As the front wedge and wedge plates move forwardly during release of the shock absorber, either the shifting lugs 41 of the front spring seat, or the shifting lugs 42 of the front wedge, or the lugs of both of these members engage with the inner edge of the front releasing bars and push the latter into their foremost position. During this forward movement of the front releasing bars, the same engage with the shoulders 25 of the front sets of friction plates and carry the latter to their foremost position. When the shock absorber is fully expanded the front follower 20 has been moved away from the outer ends of the front sets of friction plates and the rear sets of friction plates have also been carried forwardly by frictional contact with the front friction plates until the outer ends of the rear friction plates have been moved away from the rear follower 22 and the shoulders 25 of the rear friction plates are again in engagement with the outer edge of the rear releasing bars 40.

When the shock absorber is subjected to a pulling load the action is reversed, that is to say, the front follower and wedge are stationary while the rear follower, wedge, wedge plates and parts associated therewith move and function in the same manner as that previously described with reference to the front wedge, wedge plates, spring seat and releasing bars during a buffing and releasing operation.

From the foregoing it will be noticed that during compression of the shock absorber the releasing bars ride loosely or float without performing any work and during release of the shock absorber the wedge plates ride loosely or float without performing any work. It will also be noted that in this construction the spring seats operate to transmit the pressure of the main or restoring spring directly to the releasing bars for drawing the friction plates apart lengthwise and that the wedge plates or shoes take no part in this function inasmuch as the latter at no time operatively engage the releasing bars.

The advantage in this shock absorber is that the wedge plates or shoes slide laterally outward more easily and furnish a better compression when applying the shock absorber and also a more prompt and free release when relaxing the load on the same, and the same also provides a much greater shock absorbing capacity within the limits of space now available and it accomplishes this purpose by means which act promptly both during closing, compression or application and during opening, releasing or relaxation, which will stand the severest usage and not give way under the hardest shocks, and which can be produced economically and are not liable to get out of order.

It will be noted that each of the wedge blocks 31, 32, moves back and forth in unison with its respective follower or head 20, 22, and, therefore, in effect each of these wedge blocks or wedges forms a part of its companion main follower as though the same were formed integrally thereof. The same effect would be produced if each wedge block were cast in one piece with the follower against which it bears, but for manufacturing convenience and economy the same are preferably made separate.

I claim as my invention:

1. A shock absorber comprising a plurality of sets of intercalated longitudinal friction plates which are adapted to move lengthwise relatively to each other, a housing enclosing said friction plates and having a side wall engaged by the outermost friction plate and a follower adapted, during its inward movement, to engage the outer ends of the friction plates of one set, a wedge plate engaging with the innermost of said friction plates and having an inwardly facing incline and an outwardly facing incline, a releasing bar adapted during its outward movement to engage operatively with the set of friction plates which are engaged by said follower during the inward movement of the latter, a longitudinally movable wedge having an inclined face adapted to engage with the outwardly facing incline of said wedge plate, a spring seat having an outwardly facing incline engaging the inwardly facing incline of said wedge plate, a main or restoring spring engaging with said spring seat, and a releasing spring engaging with said wedge.

2. A shock absorber comprising a plurality of sets of intercalated longitudinal friction plates which are adapted to move lengthwise relatively to each other, a housing enclosing said friction plates and having a side wall engaged by the outermost friction plate and a follower adapted during its inward movement to engage the outer ends of the friction plates of one set, a wedge plate engaging with the innermost of said friction plates and having an inwardly facing incline and an outwardly facing incline, a releasing bar adapted during its outward movement to engage operatively with the set of friction plates which are engaged by said follower during the inward movement of the latter, a longitudinally movable wedge having an inclined face adapted to engage with the outwardly facing incline of said wedge plate, a spring seat having an outwardly facing incline engaging the inwardly facing incline of said wedge plate, a main or restoring spring engaging with said spring seat, and a releasing spring engaging with said wedge, the angle of the incline on said wedge and the outwardly facing incline of said wedge plate being comparatively acute or sharp and the angle of the incline on said spring seat and the inwardly facing incline on said wedge plate being relatively obtuse or blunt.

3. A shock absorber comprising a plurality of sets of intercalated longitudinal friction plates which are adapted to move lengthwise relatively to each other, a housing enclosing said friction plates and having a side wall engaged by the outermost friction plate and a follower adapted during its inward movement to engage the outer ends of the friction plates of one set, a wedge plate engaging with the innermost of said friction plates and having an inwardly facing incline and an outwardly facing incline, a releasing bar adapted during its outward movement to engage operatively with the set of friction plates which are engaged by said follower during the inward movement of the latter, a longitudinally movable wedge having an inclined face adapted to engage with the outwardly facing incline of said wedge plate, a spring seat having an outwardly facing incline engaging the inwardly facing incline of said wedge plate, a main or restoring spring engaging with said spring seat, and a releasing spring engaging with said wedge, the angle of the incline on said wedge and the outwardly facing incline of said wedge plate being comparatively acute or sharp and the angle of the incline on said spring seat and the inwardly facing incline on said wedge plate being relatively obtuse or blunt, and said spring seat being provided with a shoulder adapted to engage with said releasing bar during the outward movement of said spring seat.

4. A shock absorber comprising a plurality of sets of intercalated longitudinal friction plates which are adapted to move lengthwise relatively to each other, a housing enclosing said friction plates and having a side wall engaged by the outermost friction plate and a follower adapted during its inward movement to engage the outer ends of the friction plates of one set, a wedge plate engaging with the innermost of said friction plates and having an inwardly facing incline and an outwardly facing incline, a releasing bar adapted during its outward movement to engage operatively with the set of friction plates which are engaged by said follower during the inward movement of the latter, a longitudinally movable wedge having an inclined face adapted to engage with the outwardly facing incline of said wedge plate, a spring seat having an outwardly facing incline engaging the inwardly facing incline of said wedge plate, a main or restoring spring engaging with said spring seat, and a releasing spring engaging with said wedge, the angle of the incline on said wedge and the outwardly facing incline of said wedge plate being comparatively acute or sharp and the angle of the incline on said spring seat and the inwardly facing incline on said wedge plate being relatively obtuse or blunt, said spring seat being provided with a shoulder adapted to engage with said releasing bar during the outward movement of said spring seat, and said wedge being provided with a shoulder adapted to engage said releasing bar during the outward movement of said wedge.

5. A shock absorber comprising a plurality of sets of intercalated longitudinal friction plates which are adapted to move lengthwise relatively to each other, a housing enclosing said friction plates and having a side wall engaged by the outermost friction plate and a follower adapted during its inward movement to engage the outer ends of the friction plates of one set, a wedge plate engaging with the inner most of said friction plates and having an outwardly facing incline, a releasing bar adapted during its outward movement to engage the friction plates which are moved inwardly by said follower, a wedge having an incline engaging the incline of said wedge plate, a spring seat engaging said wedge plate and having an outwardly facing shoulder adapted to engage said releasing bar during its outward movement, a releasing spring engaging said wedge, and a main or restoring spring engaging said spring seat.

6. A shock absorber comprising a plurality of intercalated sets of friction plates, a housing having a wall engaged by the outermost of said friction plates, and a follower adapted to engage with the outer ends of one of said sets of friction plates, a wedge plate engaging with the innermost of said friction plates and having an outwardly facing incline, a wedge having an inwardly facing incline engaging said incline of the wedge plate, a releasing bar, a spring seat engaging said wedge plate, a releasing spring engaging said wedge, and a main or restoring spring engaging said spring seat, said releasing bar being moved idly inwardly by engagement therewith of the friction plates which are actuated by said follower, and said wedge plate being moved idly outwardly by engagement therewith of the spring seat which is actuated by said main or restoring spring.

7. A shock absorber comprising front and rear follower means movable toward and from one another; a plurality of sets of intercalated friction plates arranged between said follower means and adapted to be moved longitudinally inwardly relatively to one another by motion derived from said follower means; means for pressing said friction plates of the respective sets together transversely including pressure shoes bearing against one side of said sets of plates at opposite ends thereof and adapted to be shifted by the inward movement of said follower means; pressure resisting means supporting said sets of friction plates in opposition to said pressure shoes; spring seats bearing longitudinally outward against said pressure shoes, a restoring spring resistance interposed between said spring seats; and means for transmitting motion directly from said spring seats to said friction plates for restoring the latter to normal position after compression of the mechanism.

8. A shock absorber comprising front and rear followers movable toward and from one another; a plurality of intercalated friction plates arranged between said followers and adapted to be moved longitudinally inwardly relatively to one another by motion derived from said main followers; means for pressing said friction plates of the respective sets together transversely including pressure shoes bearing against one side of said sets of plates at opposite ends thereof and adapted to be shifted by said followers; pressure resisting means supporting said sets of friction plates in opposition to said pressure shoes; spring seats bearing longitudinally outward against said pressure shoes, a restoring spring resistance interposed between said spring seats; means for transmitting motion directly from said spring seats to said friction plates for restoring the latter to normal position after compression of the mechanism; and a releasing spring resistance interposed between said followers.

9. A shock absorber comprising a plurality of sets of intercalated friction plates adapted to move lengthwise relatively to one another; followers arranged at opposite ends of said plates and adapted to move relatively to each other; transverse pressure creating means arranged at opposite ends of the sets of plates and coacting with said followers and plates for pressing said plates of the respective sets together crosswise upon relative approach of said followers; transverse pressure resisting means supporting said plates in opposition to the transverse pressure creating means; a restoring spring resistance opposing relative approach of the transverse pressure creating means at opposite ends of the sets of plates; a releasing spring resistance opposing relative approach of said followers, said followers being capable of initial inward longitudinal movement while the plates are at rest and also capable of moving with said plates during the remainder of the inward movement of the followers and said followers effecting their final outward longitudinal movement while said plates are at rest and thereby aiding release of the mechanism; and means moving said plates longitudinally outward after compression by motion derived from said restoring spring resistance by transmitting pressure from the latter past said transverse pressure creating means to said plates and thereby allowing the transverse pressure creating means to float during release, said means for moving the friction plates longitudinally outward including elements which form part of the transverse pressure creating means.

10. A shock absorber comprising two sets of intercalated friction members, two follower means movable lengthwise inwardly and outwardly relatively to one another and each spaced from one of said sets of friction members in the released condition of the absorber and to effect the initial part of its inward stroke while the corresponding set of friction members is at rest and each follower means adapted to engage the respective set of friction members and cause the respective follower means and friction members to move longitudinally inward together during the remainder of said inward stroke, transverse wedge pressure creating means interposed between each of said follower means and the adjacent ends of said friction members and having co-operating wedge surfaces for causing the friction members of the respective sets to be pressed together transversely upon moving one of said follower means longitudinally inward relative to the other follower means, transverse pressure resisting means for supporting said friction members of the respective sets in opposition to said transverse pressure creating means, a spring resistance means which is increasingly loaded during compression of the mechanism, and return means which operates to move one of said sets of friction members longitudinally outward from the other set of friction members upon relaxation of the mechanism by carrying the reaction of said spring resistance past said transverse wedge pressure creating means to the respective friction members, said return means including elements which form part of the transverse pressure creating means.

11. A shock absorber comprising two sets of intercalated friction members, two follower means movable lengthwise inwardly and outwardly relatively to one another and each spaced from one of said sets of friction members in the released condition of the absorber and to effect the initial part of its inward stroke while the corresponding set of friction members is at rest and each follower means adapted to engage the respective set of friction members and compel the respective follower means and friction members to move longitudinally inward together during the remainder of said inward stroke, transverse wedge pressure creating means including shoes engaging one side of the friction members at opposite ends thereof and adapted to be moved longitudinally inwardly relatively to one another by said follower means, transverse pressure resisting means engaging the other side of said friction members, and restoring spring means acting directly upon said friction members for pulling one set lengthwise from the other upon removal of the load from the absorber.

12. A shock absorber comprising two sets of intercalated friction members, two follower means movable lengthwise inwardly and outwardly relatively to one another and each spaced from the one of said sets of friction members in the released condition of the absorber and to effect the initial part of its inward stroke while the corresponding set of friction members is at rest and each follower means being adapted to engage the respective set of friction members and compel the latter to move longitudinally inwardly therewith during the remainder of said inward stroke, transverse wedge pressure creating means including shoes engaging one side of the friction members at opposite ends thereof and adapted to be moved longitudinally inward relatively to one another by said follower means, transverse pressure resisting means engaging the other side of said friction members, restoring spring means acting directly upon said friction members for moving one set longitudinally outward from the other upon removal of the load from the absorber, and releasing spring means interposed between said follower means for separating them after compression.

13. A shock absorber, comprising two sets of intercalated friction members, two follower means movable lengthwise inwardly and outwardly relatively to one another and each follower spaced from one of said sets of friction members in the released condition of the absorber and to effect the initial part of its inward stroke while the corresponding set of friction members is at rest and each follower means being adapted to engage the respective set of friction members and move with the same longitudinally during the remainder of said inward stroke, transverse wedge pressure creating means interposed between each follower means and said friction members and cooperating with opposite ends of said friction members and having cooperating wedge surfaces for causing the friction members of the respective sets to be pressed transversely together with increased pressure upon moving one of said follower means longitudinally inward relative to the other follower means, transverse pressure resisting means for supporting said sets of friction members and said transverse pressure creating means relatively to one another, a spring resistance means increasingly stressed during compression of the mechanism, and return means which carry the reaction of said spring resistance means to said friction members for returning the latter to normal position and which include spring seats each interposed between said spring resistance and one of said transverse wedge pressure creating means, and transverse release bars each engaging one of said spring seats and one of said sets of friction members.

JOSEPH M. HALL.